(12) United States Patent
Saito et al.

(10) Patent No.: US 6,802,071 B2
(45) Date of Patent: Oct. 5, 2004

(54) OPTICAL PICKUP SUPPORTING DEVICE HAVING SIMPLE AND COMPACT STRUCTURE AND CAPABLE OF ACCURATELY SUPPORTING AN OPTICAL PICKUP

(75) Inventors: Ryuichi Saito, Murayama (JP); Atsushi Kirii, Yamagata (JP); Takashi Watanabe, Sagae (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 278 days.

(21) Appl. No.: 10/103,307

(22) Filed: Mar. 21, 2002

(65) Prior Publication Data

US 2002/0136153 A1 Sep. 26, 2002

(30) Foreign Application Priority Data

Mar. 23, 2001 (JP) .................................... 2001-085603
May 11, 2001 (JP) .................................... 2001-141001

(51) Int. Cl.[7] .............................. G11B 7/08; G11B 21/02
(52) U.S. Cl. ...................................... 720/676; 720/675
(58) Field of Search ................................ 369/215, 219, 369/244, 249; 720/672, 674, 675, 676, 677, 689

(56) References Cited

U.S. PATENT DOCUMENTS

| | | | | |
|---|---|---|---|---|
| 5,307,339 A | * | 4/1994 | Tanaka | 369/215 |
| 5,615,204 A | * | 3/1997 | Watanabe et al. | 369/247 |
| 5,761,182 A | | 6/1998 | Jeon | |
| 5,764,618 A | * | 6/1998 | Kim | 369/219 |
| 5,768,248 A | * | 6/1998 | Lee | 369/219 |
| 5,889,755 A | * | 3/1999 | Kim | 369/219 |
| 5,963,535 A | * | 10/1999 | Yamakawa et al. | 369/219 |
| 5,982,735 A | * | 11/1999 | Tsai | 369/219 |
| 5,995,478 A | * | 11/1999 | Park | 369/219 |
| 6,044,057 A | * | 3/2000 | Park et al. | 369/219 |
| 6,351,444 B1 | * | 2/2002 | Sogawa et al. | 369/219 |
| 6,385,160 B1 | * | 5/2002 | Jeon | 369/219 |
| 6,445,673 B2 | * | 9/2002 | Park | 369/219 |
| 6,483,798 B1 | * | 11/2002 | Wu | 369/219 |
| 6,567,362 B1 | * | 5/2003 | Kagaya et al. | 369/77.1 |
| 6,636,473 B1 | * | 10/2003 | Kagaya et al. | 369/249 |

FOREIGN PATENT DOCUMENTS

| | | | |
|---|---|---|---|
| EP | 0 529 589 A | | 3/1993 |
| EP | 0 717 400 A1 | | 6/1996 |
| EP | 1 083 552 A2 | | 3/2001 |
| JP | 2-214024 | * | 8/1990 |
| JP | 4-109433 | * | 4/1992 |
| JP | 11-66768 | * | 3/1999 |
| JP | 11-73745 | * | 3/1999 |
| JP | 11-126440 | * | 5/1999 |
| JP | 11-238232 | * | 8/1999 |
| JP | 11-306547 | * | 11/1999 |
| JP | 2001-52345 | * | 2/2001 |
| JP | 2002-222571 A | | 8/2002 |

* cited by examiner

Primary Examiner—David Ometz
(74) Attorney, Agent, or Firm—Frishauf, Holtz, Goodman & Chick, P.C.

(57) ABSTRACT

An optical pickup supporting device comprises a sheet metal base (10), a main track (41) for guiding an optical pickup so that the optical pickup (30) is moved in a predetermined direction above the base, and a sub track (15) for guiding the optical pickup in cooperation with the main track. The sub track is formed by a part of the base.

5 Claims, 13 Drawing Sheets

OPTICAL PICKUP SUPPORTING DEVICE HAVING SIMPLE AND COMPACT STRUCTURE AND CAPABLE OF ACCURATELY SUPPORTING AN OPTICAL PICKUP

BACKGROUND OF THE INVENTION

This invention relates to an optical pickup supporting device for use in an optical disc.

Generally, an optical pickup supporting device comprises a sheet metal base (chassis) having a generally plate-like shape, a main guide shaft mounted to the base in parallel to a plate surface of the base, and a sub guide shaft mounted to the base in parallel to both of the plate surface of the base and the main guide shaft.

When an optical pickup is driven by a drive mechanism, the optical pickup is guided by the main and the sub guide shafts in a tracking direction.

In order to meet various demands, such as a greater recording capacity of the optical disc and a higher access speed for the optical disc, it is required for an optical disc drive to have a high-accuracy mechanism. As one approach to achieve such a high-accuracy mechanism, it is proposed to improve the dimensional accuracy of components or parts of the optical disc drive. Practically, however, it is difficult to produce the parts of the optical disc drive with a higher dimensional accuracy than that achieved at present. Therefore, the above-mentioned approach can be carried out merely by producing the parts with the dimensional accuracy achieved at present and by selecting those parts which meet higher-accuracy criteria. In this event, the ratio of failed products, which are out of criteria and are not selected, is increased at the stage of parts production. This results in an increase in manufacturing cost of the optical disk drive.

In view of the above, attention is turned to another approach capable of realizing the high-accuracy mechanism without improving the dimensional accuracy of the parts. In this context, proposal is made of a method of adjusting mounting positions of the parts so as to allow dimensional inaccuracy to some extent.

As one of the parts mounting positions to be adjusted in the optical disc drive, there is an elevation angle position of each of the guide shafts for guiding the optical pickup used in the optical disc drive. The elevation angle position of the guide shaft is given by an elevation angle of the guide shaft, i.e., an angle in a vertical plane with respect to the plate surface of the base.

If the above-mentioned elevation angle position is not adjusted to an appropriate value, a laser beam emitted from the optical pickup cannot properly irradiate a data reproducing/recording surface of the optical disc. Specifically, an optical axis of the laser beam emitted from the optical pickup is inclined with respect to a principal surface of a disc table for supporting and rotating the optical disc. This phenomenon is called a skew error. Alternatively, the laser beam is not focused upon the data reproducing/recording surface of the optical disc.

In this connection, at least the main guide shaft is held and fixed on the base so that the elevation angle of the main guide shaft is adjustable by an elevation angle adjusting mechanism with respect to the plate surface of the base.

On the other hand, the sub guide shaft is not a driven part of the optical pickup which is driven by the drive mechanism but is a structure for guiding and supporting those parts following such driven part. Therefore, the sub guide shaft may not be provided with the above-mentioned elevation angle adjusting mechanism.

Next, description will be made about several existing optical pickup supporting devices.

A first existing optical pickup supporting device comprises main and sub guide shafts for guiding an optical pickup in cooperation with each other so that the optical pickup is moved in a predetermined direction. The sub guide shaft is made of resin and is attached to a sheet metal base by a so-called outsert molding.

A second existing optical pickup supporting device comprises a sheet metal base having first and second plate surfaces (upper and lower surfaces) and main and sub guide shafts arranged above the upper surface of the base for guiding an optical pickup in cooperation with each other so that the optical pickup is moved in a predetermined direction. Each of the main and the sub guide shafts is held and fixed on the upper surface of the base so that its elevation angle position (i.e., an elevation angle in a vertical plane along a thickness direction of the base) with respect to the upper surface of the base is adjustable. The optical pickup supporting device includes a pair of supporting units for supporting the main and the sub guide shafts, respectively. Each of the supporting units comprises a cylindrical cam member made of resin and rotatably attached to the upper surface of the base by outsert-molding, a holder made of resin and attached to the base to hold the main or the sub guide shaft, and a torsion spring attached to the base for pressing a peripheral surface of an end portion of the main or the sub guide shaft arranged above the base so that the guide shaft is urged towards the upper surface of the base. The cam member is provided with a spiral groove formed on its outer peripheral surface. The spiral groove receives the end portion of the main or the sub guide shaft. When the cam member is rotated, the end portion of the main or the sub guide shaft inserted in the spiral groove is moved upward or downward under the urging force of the torsion spring. Thus, the elevation angle position of the main or the sub guide shaft is adjusted.

A third existing optical pickup supporting device comprises a sheet metal base having first and second plate surfaces (upper and lower surfaces) and main and sub guide shafts arranged above the upper surface of the base. The main and the sub guide shafts serve to guide an optical pickup in cooperation with each other so that the optical pickup is moved in a predetermined direction. Each of the main and the sub guide shafts is held and fixed on the upper surface of the base so that its elevation angle position (i.e., an elevation angle in a vertical plane along a thickness direction of the base) with respect to the upper surface of the base is adjustable. The optical pickup supporting device comprises a pair of supporting units for supporting the main and the sub guide shafts, respectively. Each of the supporting units comprises a male screw engaged with a female thread portion formed in the base, a bent portion formed on the base for holding the main or the sub guide shaft, and a compression spring attached to the base for pressing a peripheral surface of an end portion of the main or the sub guide shaft arranged above the base so that the guide shaft is urged away from the upper surface of the base. The male screw has a flange portion formed at its end. The end portion of the guide shaft is held between the flange portion of the male screw and the compression spring. When the male screw is rotated, the end portion of the main or the sub guide shaft is moved upward or downward under the urging force of the compression spring. Thus, the elevation angle position of the main or the sub guide shaft is adjusted.

The first optical pickup supporting device has a metal part (the base) and a resin part (the sub guide shaft). Furthermore, the outsert molding is necessary to form the sub guide shaft on the base. Therefore, the number of steps is increased and the production cost is inevitably becomes high. In addition, it is relatively difficult to injection mold the sub guide shaft with high dimensional accuracy. Furthermore, because a major part of the sub guide shaft is arranged on the upper surface of the base, only a small space is left on the base to arrange other parts of the device. The above-mentioned structure is therefore disadvantageous in view of the reduction in thickness (height) of the optical disc drive.

The second existing optical pickup supporting device requires a large number of component parts and has a metal part (the base) and a resin part (the cam member). Furthermore, it is relatively difficult to injection mold the groove of the cam member with high dimensional accuracy. In addition, many component parts of the device are arranged on the upper surface of the base to occupy a relatively large space on the upper surface. This structure is therefore disadvantageous in view of the reduction in thickness (height) of the optical disc drive.

The third existing optical pickup supporting device also requires a large number of component parts. Furthermore, many component parts of the device are arranged on the upper surface of the base to occupy a relatively large space on the upper surface. This structure is therefore disadvantageous in view of the reduction in thickness of the optical disc drive.

In Japanese Patent Application No. 2001-16557, the present inventors have proposed an optical pickup supporting device which is simple in structure, small in occupation space on a base, and therefore advantageous in view of reduction in thickness of an optical disk drive.

The optical pickup supporting device mentioned above comprises a sheet metal base having first and second plate surfaces (upper and lower surfaces), and main and sub guide shafts both of which are made of metal. The main and the sub guide shafts serve to guide an optical pickup in cooperation with each other so that the optical pickup is moved in a predetermined direction. Each of the main and the sub guide shafts is held and fixed on the second plate surface of the base so that its elevation angle position (i.e., an elevation angle in a vertical plane along a thickness direction) with respect to the second plate surface of the base is adjustable. The optical pickup supporting device comprises a pair of supporting units for supporting the main and the sub guide shafts, respectively. Each of the supporting units comprises a male screw engaged with a female thread portion formed in the second plate surface of the base, and an extension spring directly or indirectly attached to a metal plate which is attached to the second plate surface of the base. The extension spring serves to pull an end portion of the guide shaft so that the guide shaft is urged away from the second plate surface. The male screw has a flange portion formed at its end. The end portion of the guide shaft is held by the flange portion of the male screw and the extension spring. When the male screw is rotated, the end portion of the guide shaft is moved upward or downward under the urging force of the compression spring. Thus, the elevation angle position of the guide shaft is adjusted.

The above-mentioned optical pickup supporting device has no resin parts and is therefore free from the problem of dimensional inaccuracy inevitable in molding of the resin parts. In addition, the number of component parts on the first plate surface of the base is relatively small. However, the number of component parts may possibly be reduced further.

Including the first through the third existing optical pickup supporting devices and the last-mentioned optical pickup supporting device, the device of the type generally has a comparatively large opening formed in the base to allow the movement of the optical pickup. Therefore, the sheet metal base may possibly be bent or warped. If the base is bent or warped, the flatness of the base is not kept and the guide shaft supported on the base is bent. This results in a skew error.

SUMMARY OF THE INVENTION

It is therefore an object of this invention to provide an optical pickup supporting device which is simple and compact in structure and requires a relatively small space, thereby contributing to reduction in thickness of an optical disc drive.

It is another object of this invention to provide an optical pickup supporting device which is capable of supporting an optical pickup with high accuracy.

The other objects of this invention will become clear as the description proceeds.

According to an aspect of this invention, there is provided an optical pickup supporting device for supporting an optical pickup and comprising a sheet metal base, a main track connected to the sheet metal base, and a sub track coupled to the main track, the main and the sub track guiding the optical pickup in cooperation with each other so that the optical pickup is movable in a predetermined direction above the sheet metal base, the sub track being formed by a part of the sheet metal base.

DESCRIPTION OF THE PREFERRED EMBODIMENTS

In order to facilitate an understanding of the present invention, description will at first be made about the first through the third existing optical pickup supporting devices as well as the optical pickup supporting device disclosed in Japanese Patent Application No. 2001-16557 with reference to the drawing.

Figure 1:
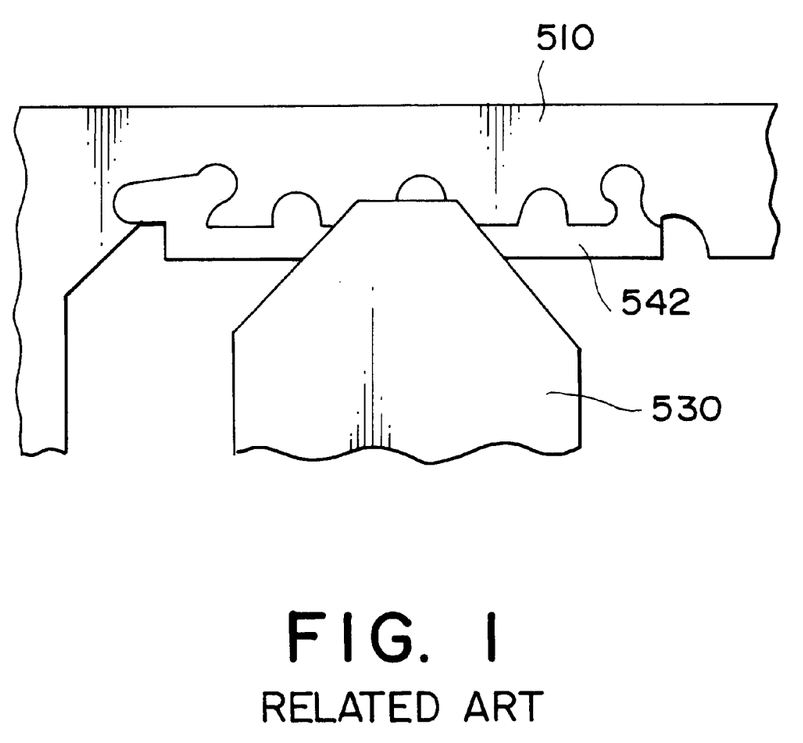
FIG. 1 is a plan view of a characteristic part of a first existing optical pickup supporting device.

Referring to FIG. 1, the first existing optical pickup supporting device comprises a main guide shaft (not shown) and a sub guide shaft 542. The main guide shaft and the sub guide shaft 542 serve to guide an optical pickup 530 in cooperation with each other so that the optical pickup 530 is moved in a predetermined direction (left/right direction in FIG. 1). The sub guide shaft 542 is made of resin and is attached to a sheet metal base 510 by a so-called outsert molding.

Figure 2:
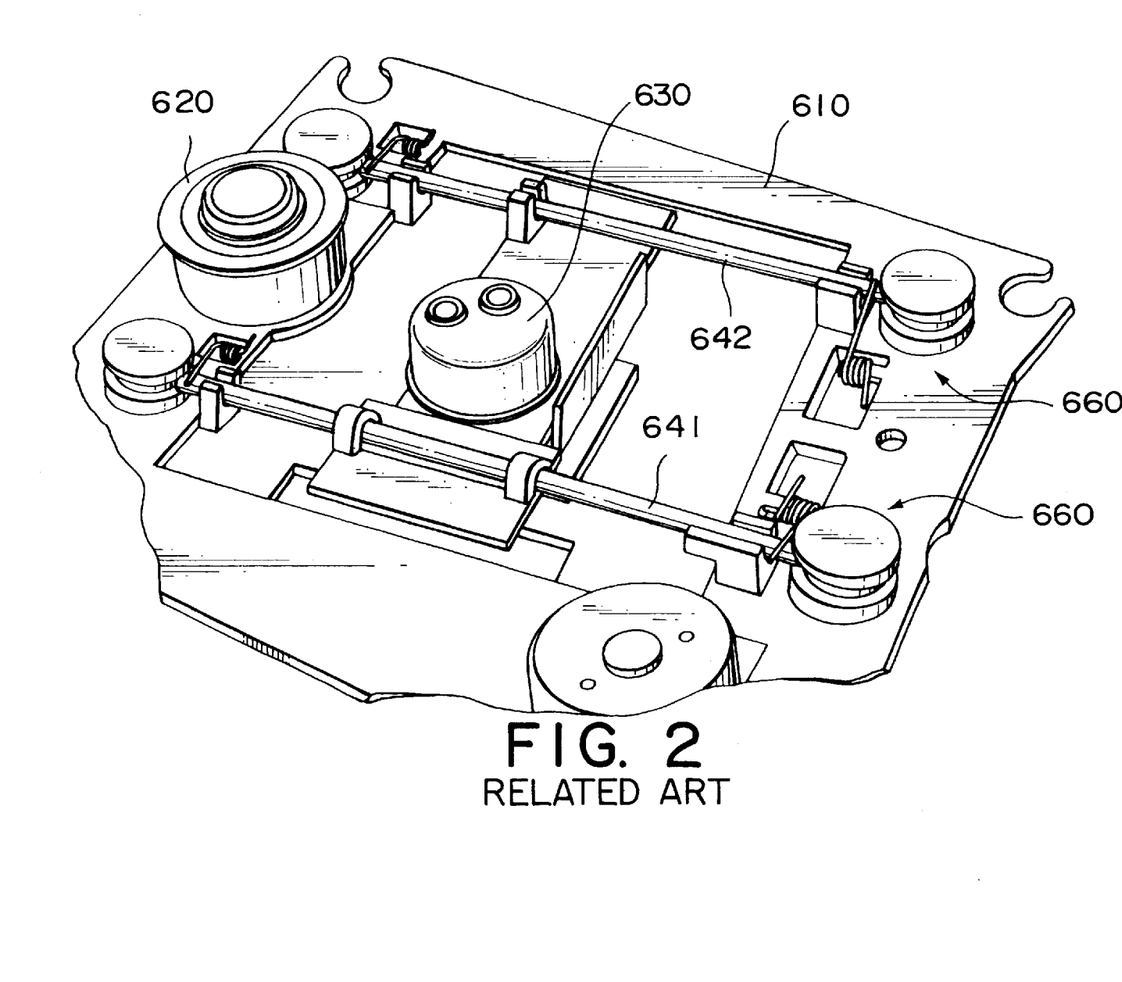
FIG. 2 is a perspective view of a second existing optical pickup supporting device.
Figure 3:
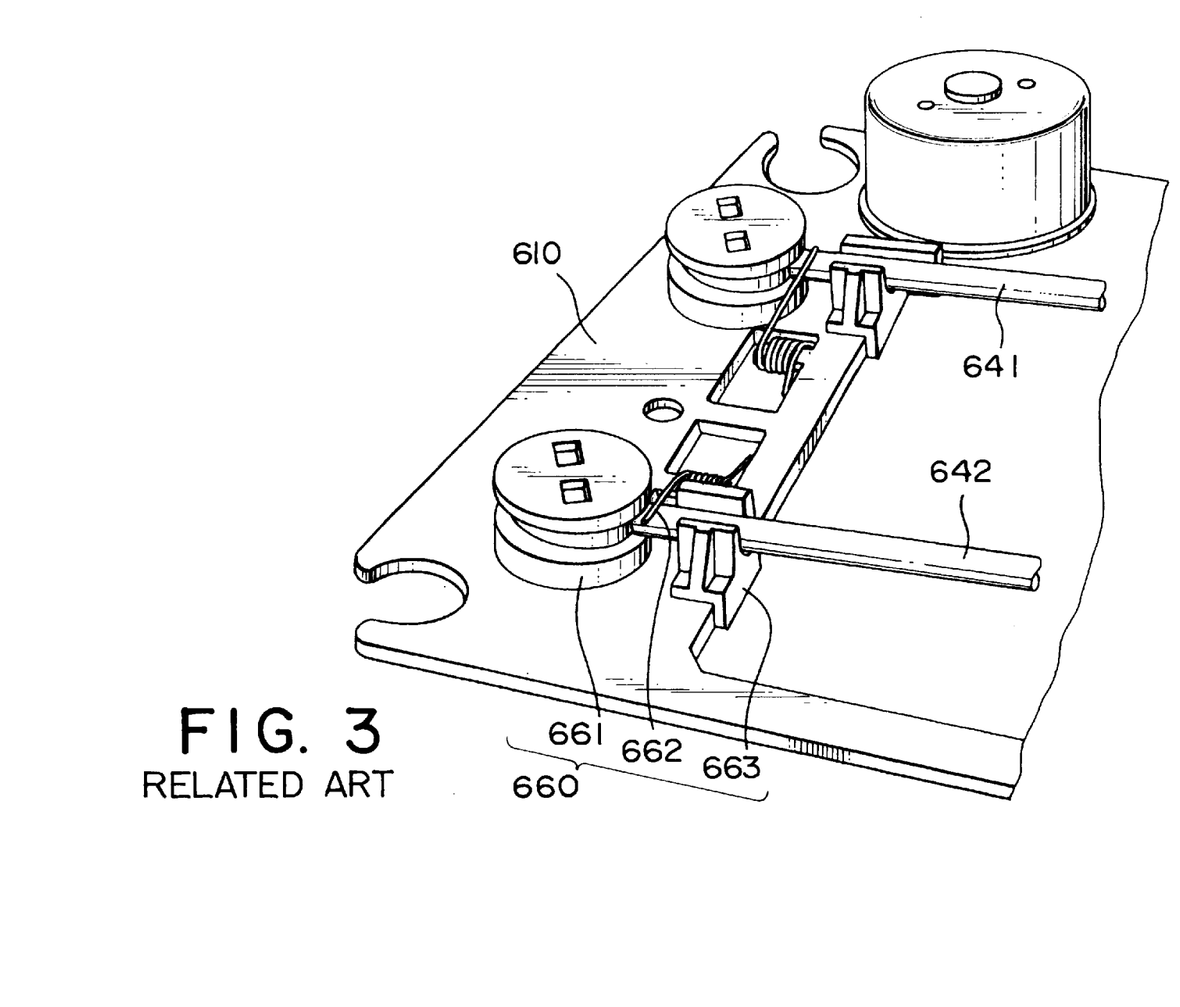
FIG. 3 is a perspective view of a characteristic part of the optical pickup supporting device shown in FIG. 2.

Referring to FIGS. 2 and 3, the second existing optical pickup supporting device comprises a sheet metal base 610 having first and second plate surfaces (upper and lower surfaces) and main and sub guide shafts 641 and 642 arranged above the upper surface of the base 610. The main and the sub guide shafts 641 and 642 serve to guide an optical pickup in cooperation with each other so that the optical pickup 630 is moved in a predetermined direction. Each of the main and the sub guide shafts 641 and 642 is held and fixed on the upper surface of the base 610 so that its elevation angle position (i.e., an elevation angle in a vertical plane along a thickness direction of the base 610) with respect to the upper surface of the base 610 is adjustable. The optical pickup supporting device includes a pair of supporting units 660 for supporting the main and the sub guide shafts, respectively. Each of the supporting units comprises a cylindrical cam member 661 made of resin and rotatably attached to the upper surface of the base 610 by outsert molding, a holder 663 made of resin and attached to the base 610 to hold the main or the sub guide shaft 641 or 642, and a torsion spring 662 attached to the base 610 for pressing a peripheral surface of an end portion of the main or the sub guide shaft 641 or 642 arranged above the upper surface of the base 610 so that the guide shaft is urged toward the upper surface. The cam member 661 is provided with a spiral groove formed on its outer peripheral surface. The spiral groove receives the end portion of the main or the sub guide shaft 641 or 642. When the cam member 661 is rotated, the end portion of the main or the sub guide shaft 641 or 642 inserted in the spiral groove is moved upward or downward under the urging force of the torsion spring 662. Thus, the elevation angle position of the main or the sub guide shaft 641 or 642 is adjusted.

Figure 4:
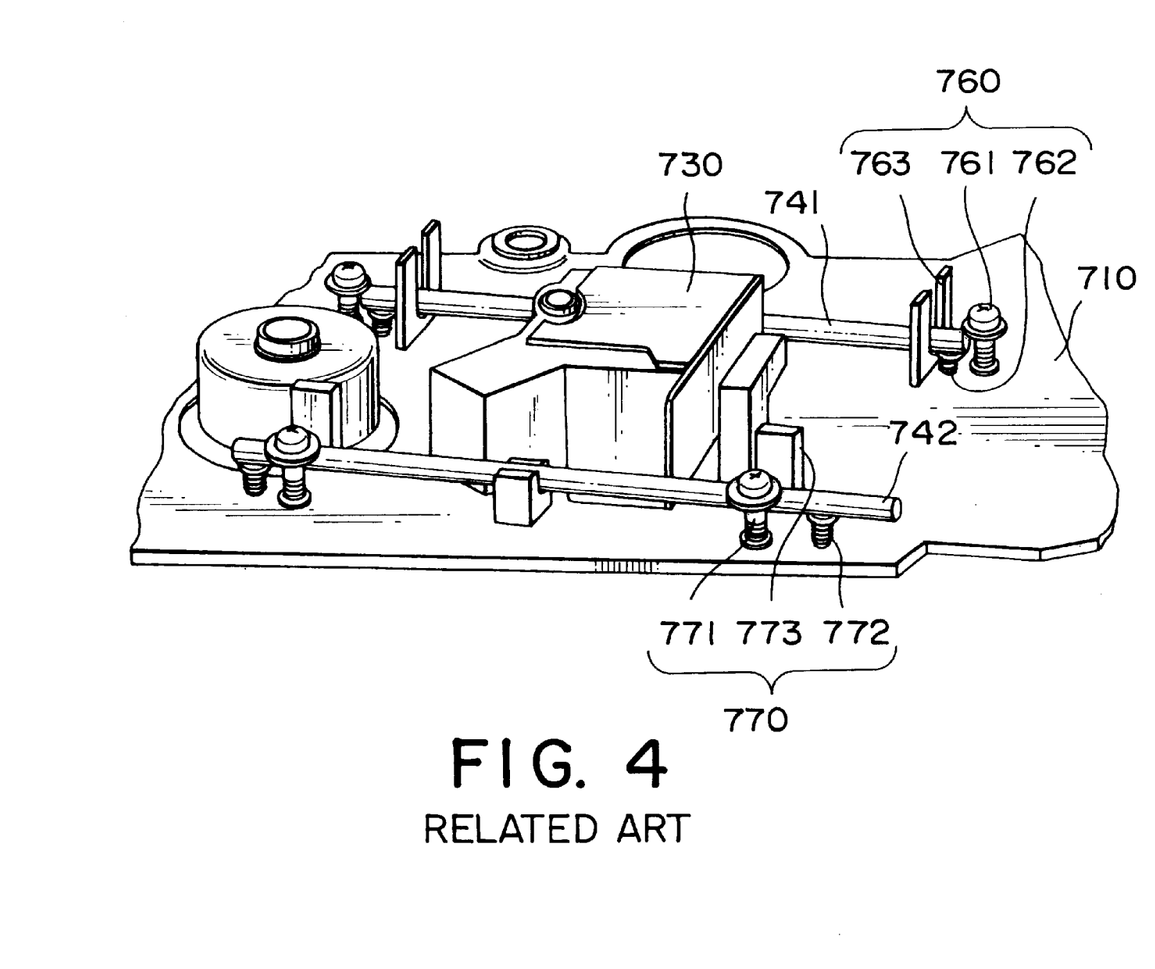
FIG. 4 is a perspective view of a third existing optical pickup supporting device.
Figure 5:
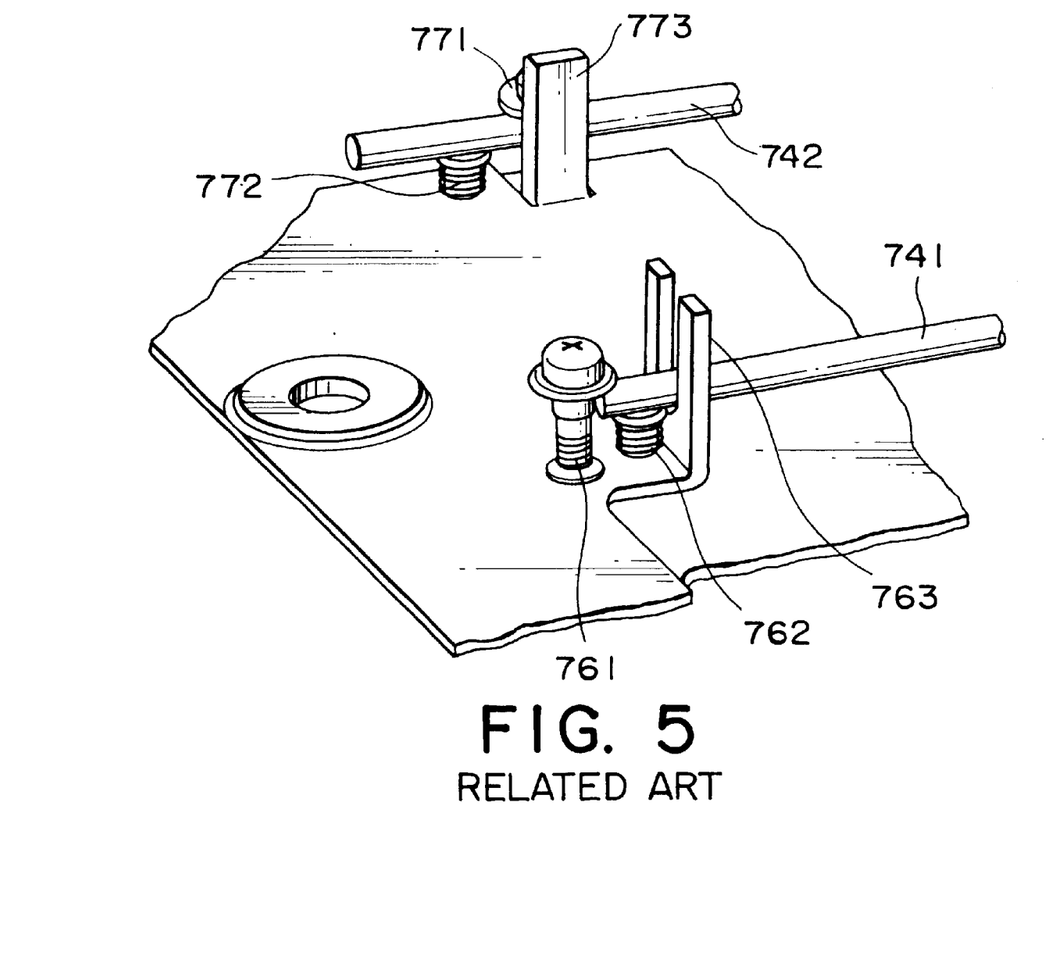
FIG. 5 is a perspective view of a characteristic part of the optical pickup supporting device shown in FIG. 4.

Referring to FIGS. 4 and 5, the third existing optical pickup supporting device comprises a sheet metal base 710 having first and second plate surfaces (upper and lower surfaces) and main and sub guide shafts 741 and 742 arranged above the upper surface of the base 710. The main and the sub guide shafts 741 and 742 serve to guide an optical pickup 730 in cooperation with each other so that the optical pickup 730 is moved in a predetermined direction. Each of the main and the sub guide shafts 741 and 742 is held and fixed on the upper surface of the base 710 so that its elevation angle position (i.e., an elevation angle in a vertical plane along a thickness direction of the base 710) with respect to the upper surface of the base 710 is adjustable. The optical pickup supporting device comprises a pair of supporting units 760 for supporting the main and the sub guide shafts 741 and 742, respectively. Each of the supporting units 760 comprises a male screw 761 engaged with a female thread portion formed in the base 710, a bent portion 763 formed on the base 710 for holding the main or the sub guide shaft 741 or 742, and a compression spring 762 attached to the base 710 for pressing a peripheral surface of an end portion of the main or the sub guide shaft 741 or 742 arranged above the base 710 so that the guide shaft is urged away from the upper surface of the base 710. The male screw 761 has a flange portion formed at its end. The end portion of the main or the sub guide shaft 741 or 742 is held between the flange portion of the male screw 761 and the compression spring 762. When the male screw 761 is rotated, the end portion of the main or the sub guide shaft 741 or 742 is moved upward or downward under the urging force of the compression spring 762. Thus, the elevation angle position of the main or the sub guide shaft 741 is adjusted.

Figure 6:
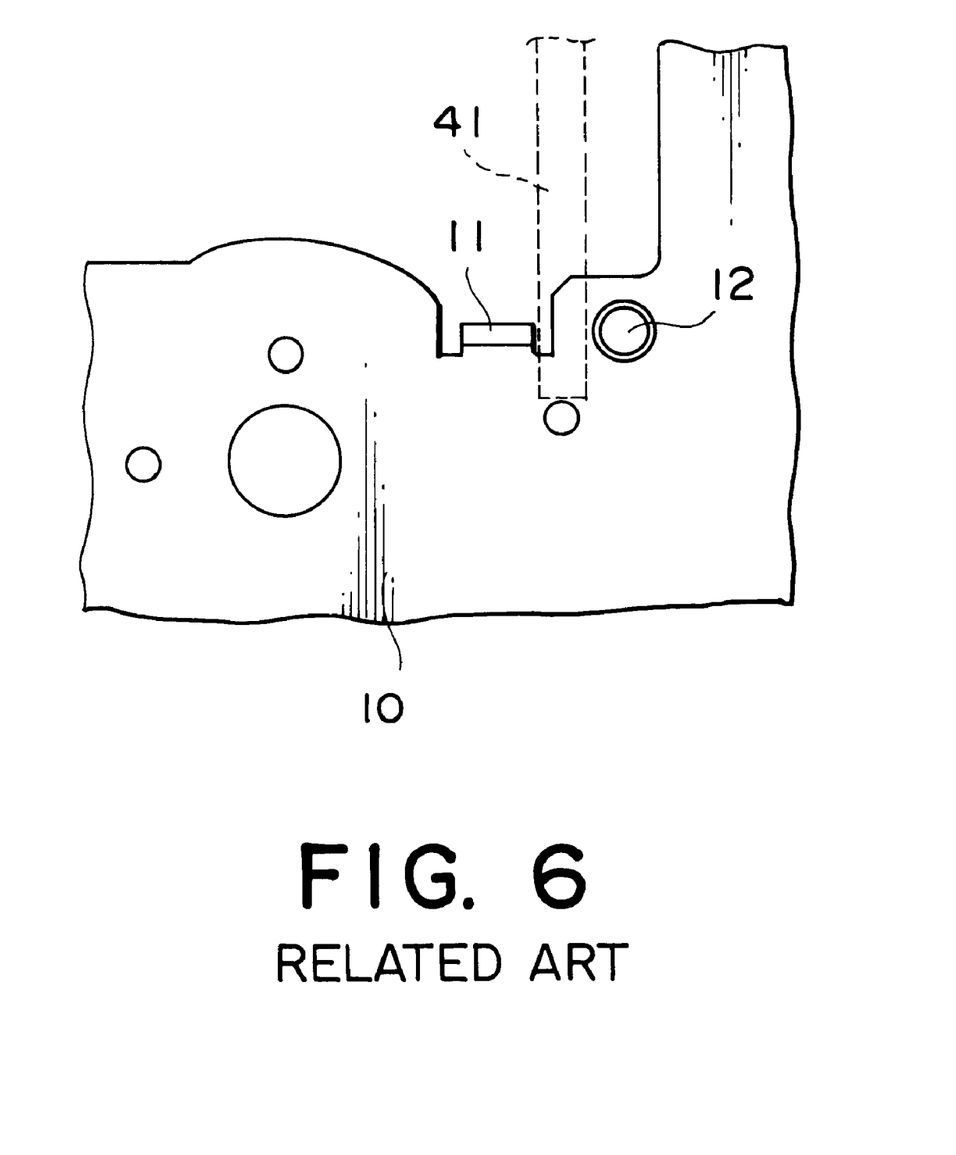
FIG. 6 is a plan view of a part of an optical pickup supporting device already proposed by the present inventors.
Figure 7:
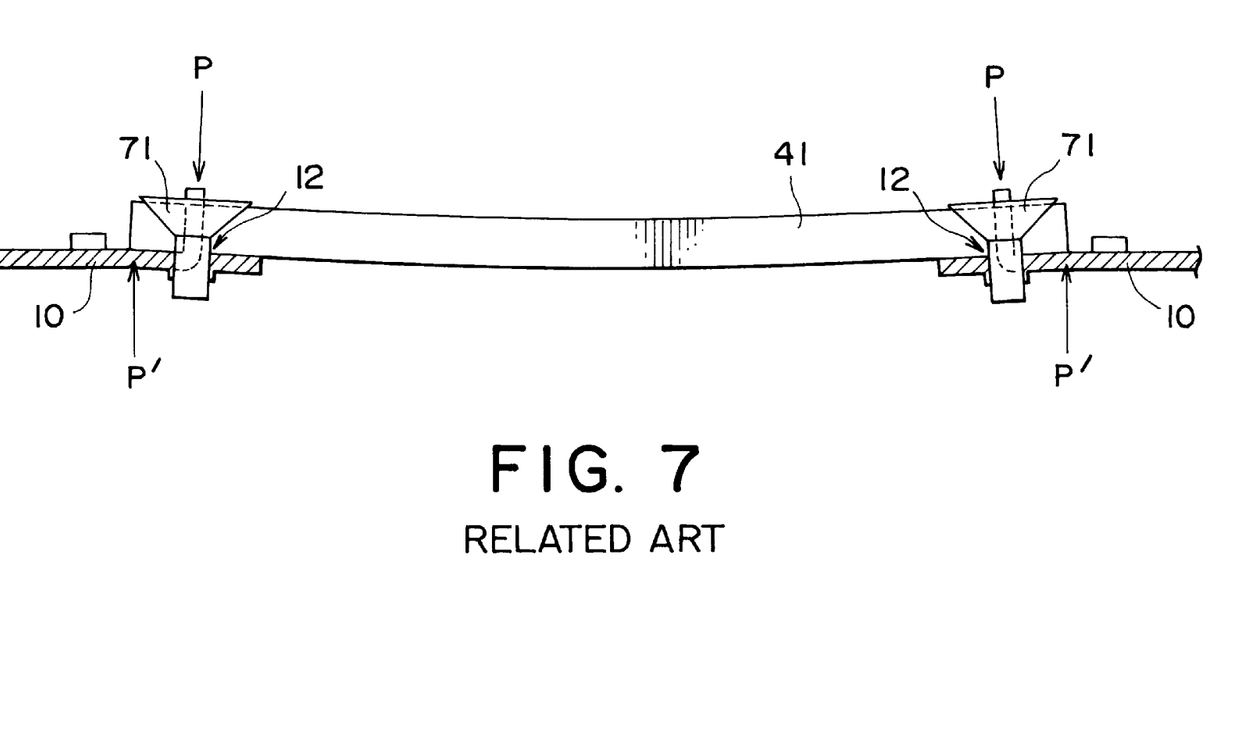
FIG. 7 is a sectional view of the optical pickup supporting device shown in FIG. 6.

Referring to FIGS. 6 and 7, description will be made of the optical pickup supporting device disclosed in Japanese Patent Application No. 2001-16557 by the present inventors.

As illustrated in FIGS. 6 and 7, a male screw 71 (FIG. 7) is engaged with a female thread portion 12 formed in a sheet metal base 10. A bent portion 11 formed on the base 10 holds a guide shaft 41 on the base 10 in cooperation with the male screw 71. When the guide shaft 41 is held on the base 10 by the male screw 71, a rotation moment may be produced by a clamping force P of the male screw 71 and a reaction force P' produced at an end portion of the guide shaft 41 so that the base 10 is warped. FIG. 7 shows a situation where the base 10 is warped. In the figure, the degree of warp is emphasized to help understanding of the invention.

The existing optical pickup supporting devices have problems described in the background.

Now, preferred embodiments of the present invention will be described with reference to the drawing.

A disc drive to which an optical pickup supporting device according to this invention is applicable is used in a CD-DA (Compact Disc-Digital Audio) player known in the art.

First Embodiment

Figure 8:
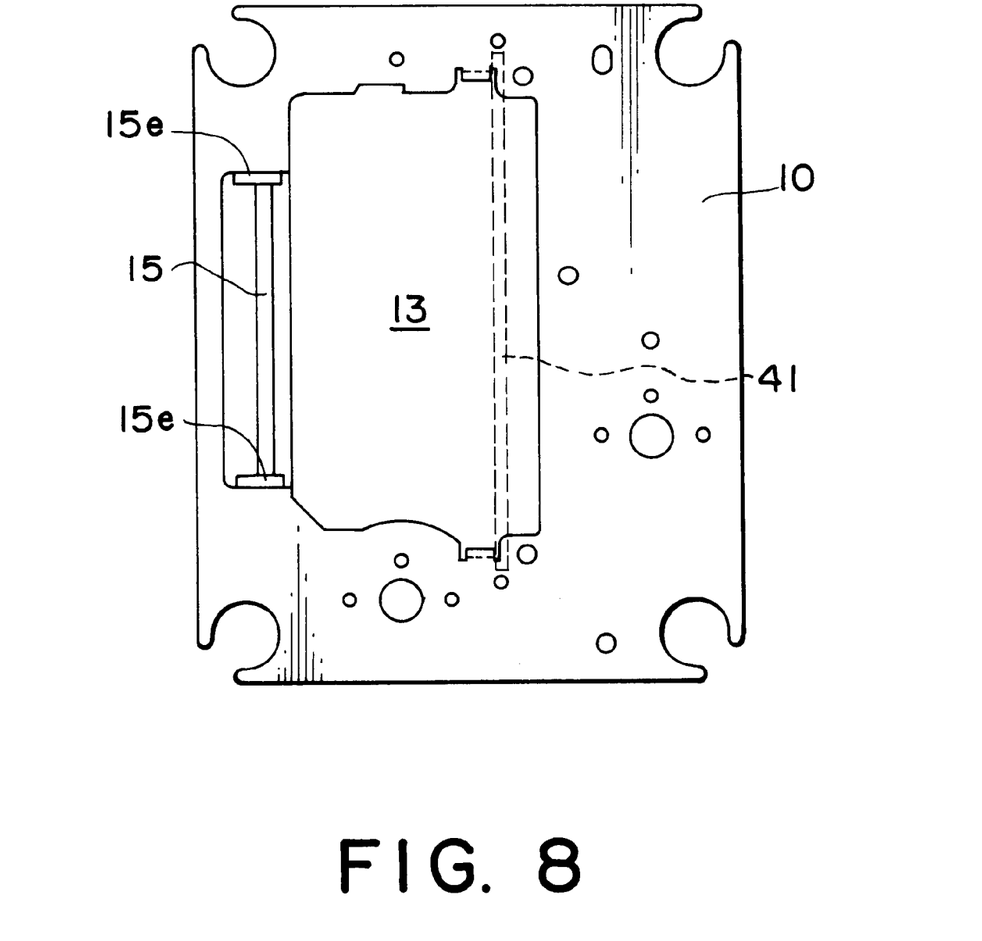
FIG. 8 is a plan view of a base used in an optical pickup supporting device according to a first embodiment of this invention.
Figure 9:
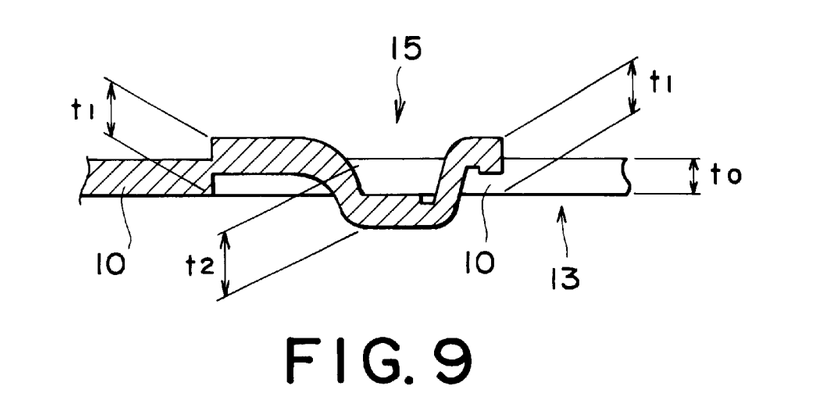
FIG. 9 is a sectional view of a characteristic part of the base shown in FIG. 8.
Figure 10:
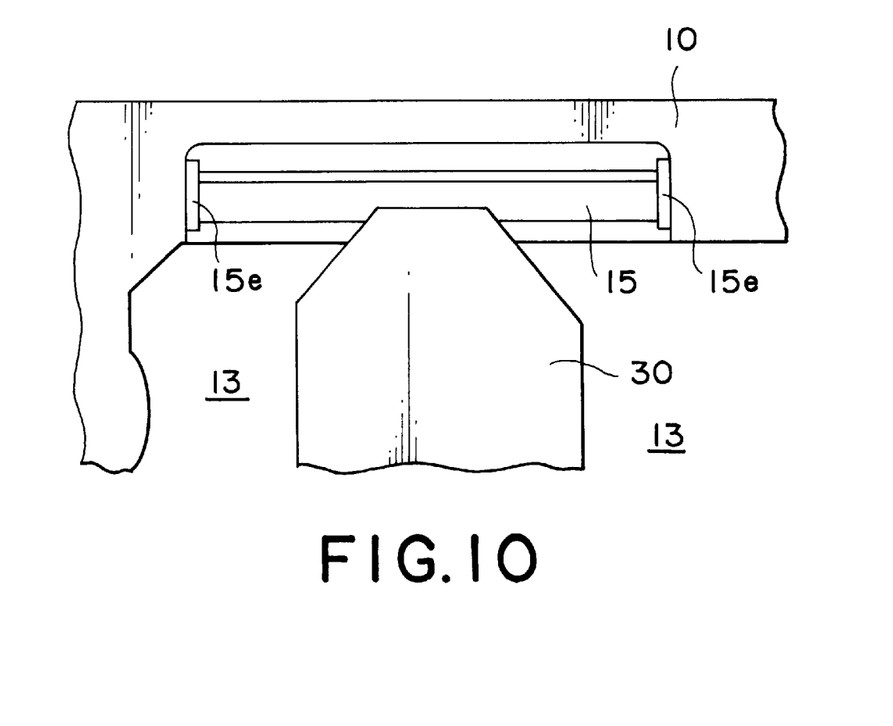
FIG. 10 is a plan view of a characteristic part of the optical pickup supporting device according to the first embodiment of this invention.

Referring to FIGS. 8 to 10, an optical pickup supporting device according to a first embodiment of this invention comprises a sheet metal base 10, a main track or main guide shaft 41 for guiding an optical pickup 30 so that the optical pickup 30 is moved in a predetermined direction (up/down direction in FIG. 8 and left/right direction in FIG. 10) above the base 10, and a sub track 15 for guiding the optical pickup 30 in cooperation with the main guide shaft 41. Since the structure of each of the optical pickup 30 and a tracking mechanism is not related to the gist of this invention, description and illustration thereof will be omitted herein.

The sub track 15 is formed by a part of the base 10 and is therefore made of a metal material same as the base 10. Specifically, the sub track 15 is formed by drawing the base 10. The drawing can be performed simultaneously with press forming of the base 10. Therefore, the optical pickup supporting device requires a small number of production steps. In FIG. 8, a reference symbol 15e represents a slot required for the drawing.

As apparent from FIG. 9, the sub track 15 is provided with protruding portions protruding from upper and lower surfaces of the base 10, respectively. With this structure, the base 10 has rigidity equivalent to that of a sheet metal having a thickness $t_1$ or $t_2$ thicker than a thickness $t_0$ of the base 10. Therefore, although a wide opening 13 is formed in a center region of the base 10, the base 10 has high rigidity to be resistant against torsional stress and therefore provides high dimensional accuracy.

Taking the friction between the sub track 15 and the optical pickup 30 into consideration, the sub track 15 is preferably subjected to surface smoothing treatment on a sliding surface along which the optical pickup 30 performs sliding movement.

Figure 11:
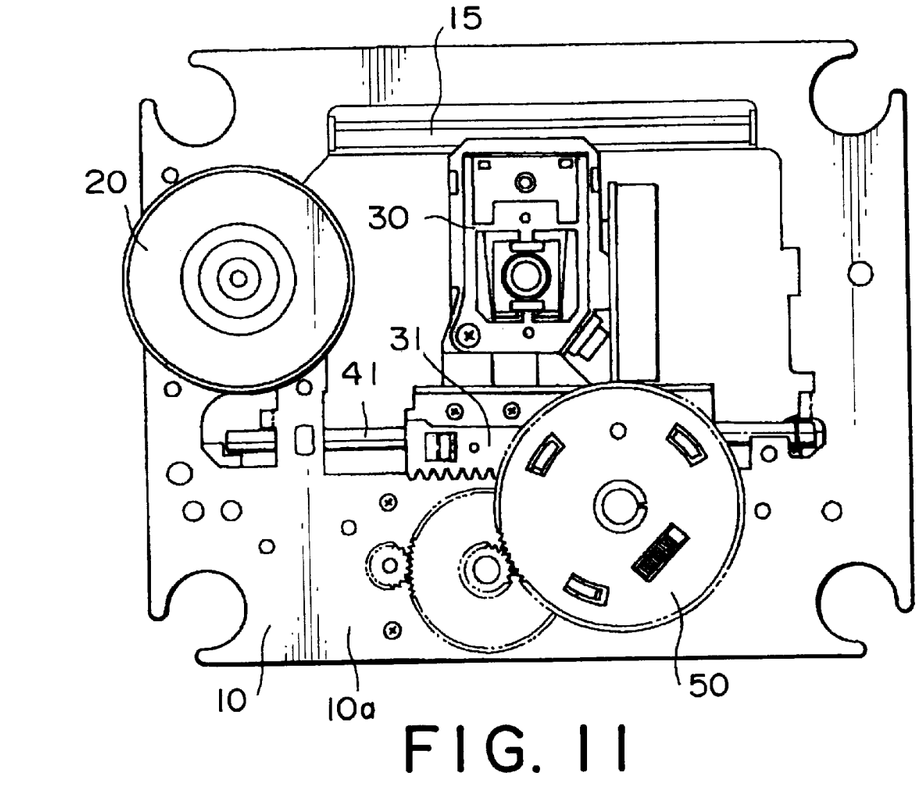
FIG. 11 is a plan view of the optical pickup supporting device according to the first embodiment of this invention.
Figure 12:
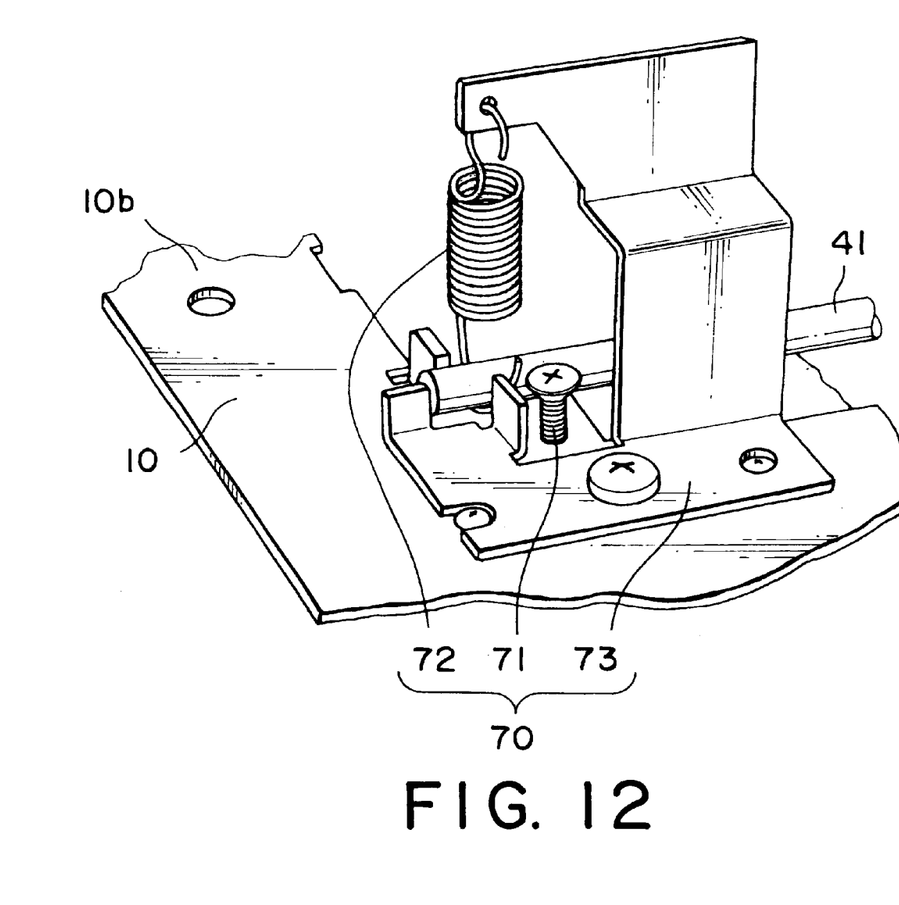
FIG. 12 is a perspective view of a characteristic part of the optical pickup supporting device shown in FIG. 11.

Referring to FIGS. 11 and 12, the main track of the optical pickup supporting device comprises the main guide shaft 41 made of metal. The base 10 has first and second plate surfaces (upper and lower surfaces) 10a and 10b. Furthermore, the optical pickup supporting device has an elevation angle adjusting mechanism 70 for holding the main guide shaft 41 so that the elevation angle position of the main guide shaft 41 with respect to the second plate surface 10b of the base 10 is adjustable.

In FIG. 11, the optical pickup 30 has a rack 31 as a driven portion, a gear 50 as a part of a driving portion, and a turntable 20 for supporting an optical disc.

The elevation angle adjusting mechanism 70 has a male screw 71 engaged with a female thread portion formed on the second plate surface 10b of the base 10 and an extension spring 72 suspended above the second plate surface 10b through a metal bracket 73. The metal bracket 73 may be formed by pressing sheet metal. The extension spring 72 pulls an end portion of the main guide shaft 41 arranged above the second plate surface 10b of the base 10 so that the end portion of the main guide shaft 41 is urged upward. On the other hand, the male screw 71 has a head portion pressed against the end portion of the main guide shaft 41. Thus, the male screw 71 and the extension spring 72 hold the main guide shaft 41 above the base 10 in cooperation with each other. By rotating the male screw 71, the elevation angle position of the main guide shaft 41 is adjusted.

The main guide shaft 41 has one end (left end in FIG. 11) as a reference end directly placed on the second plate surface 10b of the base 10. On the other hand, the other end (right end in FIG. 11) of the main guide shaft 41 is indirectly placed on the second plate surface 10b through the vertical angle adjusting mechanism 70. Consequently, by appropriately adjusting the male screw 71 of the elevation angle adjusting mechanism 70, an inclination angle of the main guide shaft 41 can be adjusted.

The above-mentioned optical pickup supporting device is simple in structure and small in number of parts. Since a small number of component parts are arranged on the side of the first plate surface 10a of the base 10, the device is advantageous in view of reduction in thickness (height) of the optical disc drive.

Second Embodiment

Figure 13:
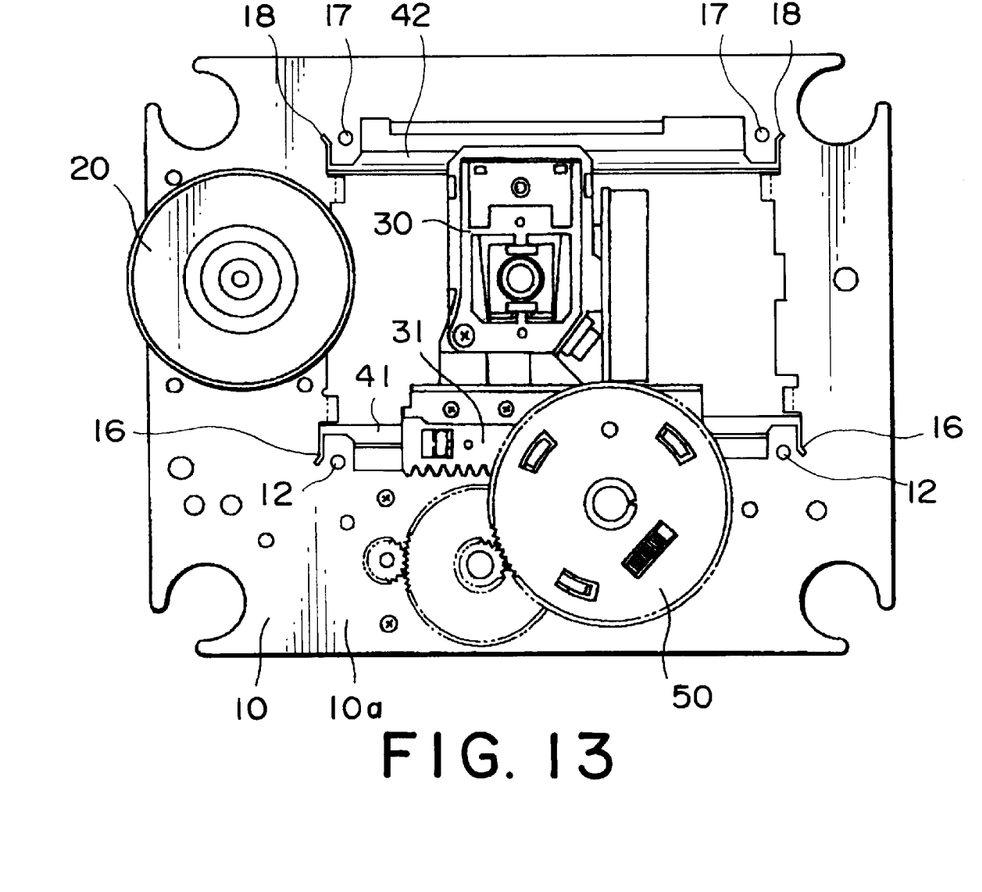
FIG. 13 is a plan view showing an optical pickup supporting device according to a second embodiment of this invention.
Figure 14:
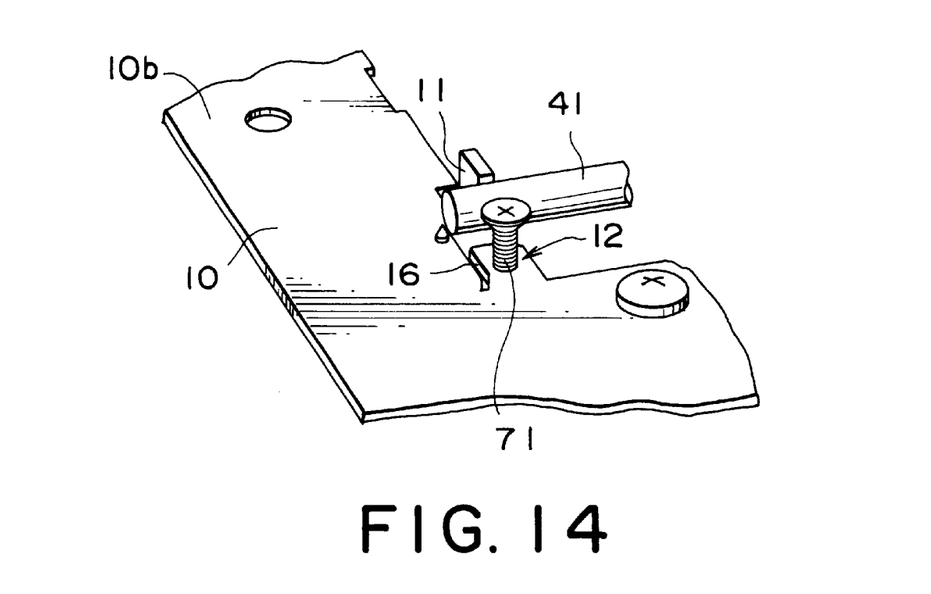
FIG. 14 is a perspective view of a characteristic part of the optical pickup supporting device shown in FIG. 13.

Referring to FIGS. 13 and 14, an optical pickup supporting device according to a second embodiment of this invention comprises, like the first embodiment, a sheet metal base 10 having first and second plate surfaces (upper and lower surfaces) 10a and 10b, a main guide shaft 41 as a main track arranged above the second plate surface 10b for guiding an optical pickup 30 so that the optical pickup 30 is moved in a predetermined direction (up/down direction in FIG. 13), and a sub guide shaft 42 as a sub track arranged above the second plate surface 10b for guiding the optical pickup 30 in cooperation with the main guide shaft 41.

The optical pickup supporting device has an elevation angle adjusting mechanism for holding the main guide shaft 41 so that the elevation angle position of the main guide shaft 41 with respect to the second plate surface 10b of the base 10 is adjustable.

The elevation angle adjusting mechanism 70 has a male screw 71 w having a countersunk head and engaged with a female thread portion 12 formed on the second plate surface 10b of the base 10, and an extension or a compression spring (not shown) arranged above or on the second plate surface 10b. The spring pulls an end portion of the main guide shaft 41 arranged above the second plate surface 10b. On the other hand, the countersunk head of the male screw 71 is pressed against the end portion of the main guide shaft 41 arranged above the second plate surface 10b. Thus, the male screw 71 and the spring hold the main guide shaft 41 above the base 10 in cooperation with each other. By rotating the male screw 71, the elevation angle position of the main guide shaft 41 is adjusted.

The vertical angle adjusting mechanism 70 further has a supporting protrusion 11 formed on the second plate surface 10b of the base 10. In cooperation with the male screw 71 and the spring, the supporting protrusion 11 holds the main guide shaft 41 in a direction parallel to the second plate surface 10b and perpendicular to a tracking direction (direction of movement of the optical pickup 30 or an axial direction of the main guide shaft 41). In the similar manner, the sub guide shaft 42 is also held by a supporting protrusion in a direction parallel to the second plate surface 10b and perpendicular to the tracking direction.

Like the first embodiment, the optical pickup supporting device according to the second embodiment is simple in structure and small in number of parts. Since a small number of component parts are arranged on the side of the first plate surface 10a of the base 10, the device is advantageous in view of reduction in thickness (height) of the optical disc drive.

Figure 15:
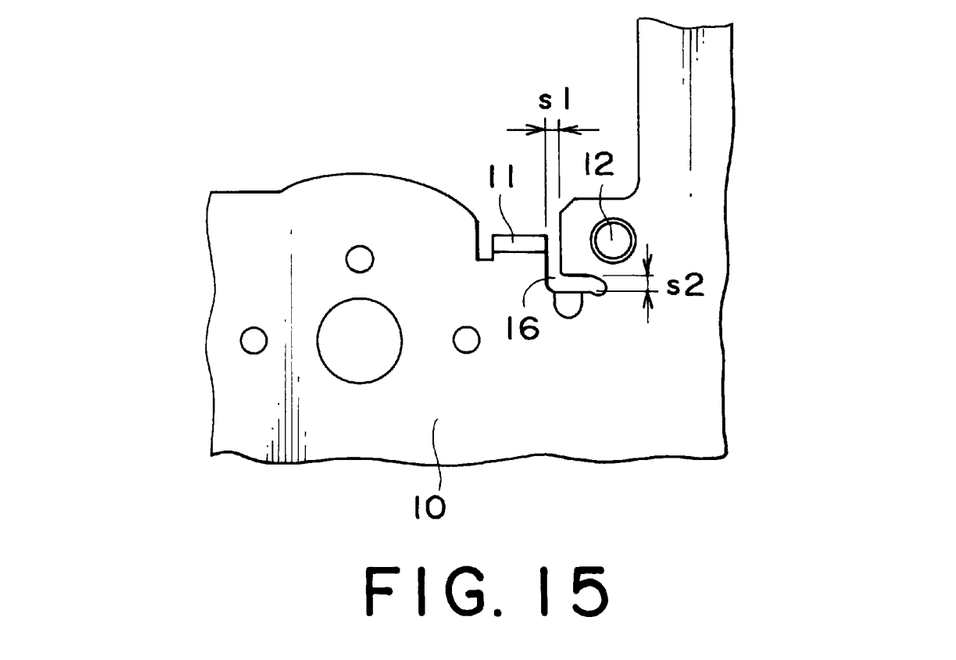
FIG. 15 is a plan view of a characteristic part of a base used in the optical pickup supporting device shown in FIG. 14.

As apparent from FIG. 15, the optical pickup supporting device further has a slit portion 16 formed on the base 10 around the female thread portion 12 to be engaged with the male screw 71 (not shown in FIG. 15). In this embodiment, the slit portion 16 extends between the female thread portion 12 and the supporting protrusion 11 to be pressed by the main guide shaft 41 (not shown in FIG. 15).

With the above-mentioned structure, even if stress is applied to the base 10 when the male screw 71 is engaged with the female thread portion 12, the stress is interrupted at the slit portion 16. Therefore, the base 10 is not warped unlike the base shown in FIG. 7. Thus, the base 10 keeps its flatness so that the main guide shaft 41 is not subjected to the stress. Therefore, the optical pickup supporting device can support the optical pickup 30 with high accuracy. The widths s1 and s2 of the slit portion 16 are appropriately selected depending upon the structure of the base 10.

In addition, sub female thread portions 17 are formed on the base 10 in the vicinity of the sub guide shaft 42. The base 10 has sub slit portions 18 which extend around the sub female thread portions 17, respectively.

Third Embodiment

Although not shown in the figure, an optical pickup supporting device according to a third embodiment of this invention comprises a sheet metal base having first and second plate surfaces, a main guide shaft as a main track arranged above the second plate surface for guiding an optical pickup so that the optical pickup is moved in a predetermined direction, and a sub track for guiding the optical pickup in cooperation with the main guide shaft. The optical pickup supporting device further comprises an elevation angle adjusting mechanism including a male screw and a spring. The elevation angle adjusting mechanism holds the main guide shaft above the second plate surface of the base so that the elevation angle position of the main guide shaft is adjustable.

Like in the first embodiment, the sub track is formed by drawing the base and therefore comprises a part of the base. The sub track includes protruding portions protruding from the first and the second plate surfaces of the base. With this structure, the base has high rigidity. Therefore, although the base has a large opening formed in a center region of the base, the base is highly resistant against torsional stress and is high in accuracy.

Furthermore, like in the second embodiment, the optical pickup supporting device of the third embodiment has a supporting protrusion formed on the second plate surface of the base. In cooperation with the male screw and the spring, the supporting protrusion holds the main guide shaft in a direction parallel to the second plate surface and perpendicular to a tracking direction. The optical pickup supporting device further has a slit portion formed on the base around the female thread portion to be engaged with the male screw. The slit portion extends between the female thread portion and the supporting protrusion. With this structure, even if stress is applied to the base when the male screw is engaged with the female thread portion, the stress is interrupted at the slit portion. Therefore, the base is not warped. Thus, because the base keeps its flatness, the main guide shaft is not subjected to the stress. Therefore, the optical pickup supporting device can support the optical pickup with high accuracy.

Like the first and the second embodiments, the above-mentioned optical pickup supporting device according to the third embodiment is simple in structure and small in number of parts. Since a small number of component parts are arranged on the side of the first plate surface of the base, the device is advantageous in view of reduction in thickness (height) of the optical disc drive.

While this invention has thus far been described in conjunction with a few preferred embodiments thereof, it will now be readily possible for those skilled in the art to put this invention into practice in various other manners. For example, in the foregoing embodiments, the description has been directed to the case where the optical pickup supporting device is applied to the CD player for the CD-DA. However, this invention is not restricted thereto but may be applicable to a CD-ROM drive, a CD-R drive, a CD-RW drive, a DVD-ROM drive, a DVD-RAM drive, a DVD-RW drive, a DVD+RW drive, an MO drive, or an MD drive.

What is claimed is:

1. An optical pickup supporting device for supporting an optical pickup, said optical pickup supporting device comprising:

a sheet metal base;

a main track connected to said sheet metal base; and a sub track coupled to said main track, wherein said main and said sub track guide said optical pickup in cooperation with each other so that said optical pickup is movable in a predetermined direction above said sheet metal base, said sub track being formed by a part of said sheet metal base;

wherein said sub track is formed by drawing said base and includes a protruding portion protruding from first and second plate surfaces of said base;

wherein said protruding portion has a cup shape in a cross section perpendicular to said predetermined direction provided with a pair of wall side portions and an end side portion;

wherein said pair of wall side portions protrude from said first plate surface of said base;

wherein said end side portion bridges both ends of said wall side portions and protrudes from said second plate surface of said base; and wherein said protruding portion continuously extends at least in a region where said optical pickup is movable in said predetermined direction.

2. The optical pickup supporting device according to claim 1, wherein said sub track has a sliding surface along which said optical pickup slides, and wherein said sliding surface has been subjected to surface smoothing treatment.

3. The optical pickup supporting device according to claim 1, further comprising a male screw engaged with a female thread portion formed on said base and a slit portion formed on said base around said female thread portion, wherein said main track is supported above said base by said male screw.

4. The optical pickup supporting device according to claim 3, further comprising a supporting protrusion formed on said base for supporting said main track so that said main track extends in a direction parallel to said plate surfaces of said base and perpendicular to a tracking direction, wherein said slit portion is formed on said base between said female thread portion and said supporting protrusion.

5. The optical pickup supporting device according to claim 1, wherein said optical pickup supporting device further comprises a male screw engaged with a female thread portion formed on said second plate surface of said base and an extension spring suspended above said second plate surface;

wherein said extension spring pulls an end portion of said shaft arranged above said second plate surface so that said end portion is urged upward;

wherein said male screw includes a head portion pressed against said end portion of said shaft; and wherein said male screw and said extension spring hold said shaft above said base in cooperation with each other so that said shaft is kept at an elevation angle position which is adjusted by rotating said male screw.

* * * * *